(12) United States Patent
Jagiella et al.

(10) Patent No.: US 10,309,873 B2
(45) Date of Patent: Jun. 4, 2019

(54) METHOD FOR SERVICING A FIELD DEVICE

(71) Applicant: Endress + Hauser Conducta Gesellschaft für Mess- und Regeltechnik mbH + Co. KG, Gerlingen (DE)

(72) Inventors: Manfred Jagiella, Ntzingen (DE); Detlev Wittmer, Maulbronn (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 845 days.

(21) Appl. No.: 14/456,050

(22) Filed: Aug. 11, 2014

(65) Prior Publication Data

US 2015/0046125 A1 Feb. 12, 2015

(30) Foreign Application Priority Data

Aug. 12, 2013 (DE) .................. 10 2013 013 299

(51) Int. Cl.
*G01M 99/00* (2011.01)
*G06K 7/10* (2006.01)
(Continued)

(52) U.S. Cl.
CPC ........ *G01M 99/008* (2013.01); *G01M 99/005* (2013.01); *G05B 19/042* (2013.01);
(Continued)

(58) Field of Classification Search
CPC .................. G01M 99/008; G01M 99/005; G05B 19/042; G06K 7/10297; G06K 7/1404; G08C 17/02
See application file for complete search history.

(56) References Cited

U.S. PATENT DOCUMENTS

| 7,463,149 B2 | 12/2008 | Friedrich | |
|---|---|---|---|
| 2005/0164684 A1* | 7/2005 | Chen .................. | G05B 19/0423 455/414.1 |

(Continued)

FOREIGN PATENT DOCUMENTS

| CN | 1804744 A | 7/2006 |
|---|---|---|
| CN | 102873909 A | 1/2013 |

(Continued)

*Primary Examiner* — John E Breene
*Assistant Examiner* — Jeffrey C Morgan
(74) *Attorney, Agent, or Firm* — Mark A. Logan; PatServe

(57) ABSTRACT

A method for servicing a field device, wherein the field device is connected with a superordinated data processing system, includes steps as follows: transmitting data associated with the field device, especially measured values or diagnosis relevant parameters, from the superordinated data processing system to the service device via a radio connection between a mobile, especially portable, service device and the superordinated data processing system based on identification information uniquely identifying a field device transceiver associated with the field device; and/or transmitting servicing data, especially parameter data and/or control commands, from the service device to the superordinated data processing system; and servicing the field device through the superordinated data processing system based on the servicing data transmitted from the service device.

11 Claims, 1 Drawing Sheet

(51) Int. Cl.
*G06K 7/14* (2006.01)
*G08C 17/02* (2006.01)
*G05B 19/042* (2006.01)

(52) U.S. Cl.
CPC ....... *G06K 7/10297* (2013.01); *G06K 7/1404* (2013.01); *G08C 17/02* (2013.01)

(56) References Cited

U.S. PATENT DOCUMENTS

| | | | |
|---|---|---|---|
| 2006/0064491 A1* | 3/2006 | Ebert | G16H 40/40 709/226 |
| 2006/0244565 A1 | 11/2006 | Friedrich et al. | |
| 2009/0030950 A1* | 1/2009 | Maneval | H04L 67/025 |

FOREIGN PATENT DOCUMENTS

| | | |
|---|---|---|
| CN | 102981457 A | 3/2013 |
| CN | 103020780 A | 4/2013 |
| CN | 202995420 U | 6/2013 |
| DE | 102004050383 A1 | 4/2006 |
| DE | 102007039531 A1 | 2/2009 |
| DE | 102011078366 A1 | 1/2013 |

\* cited by examiner

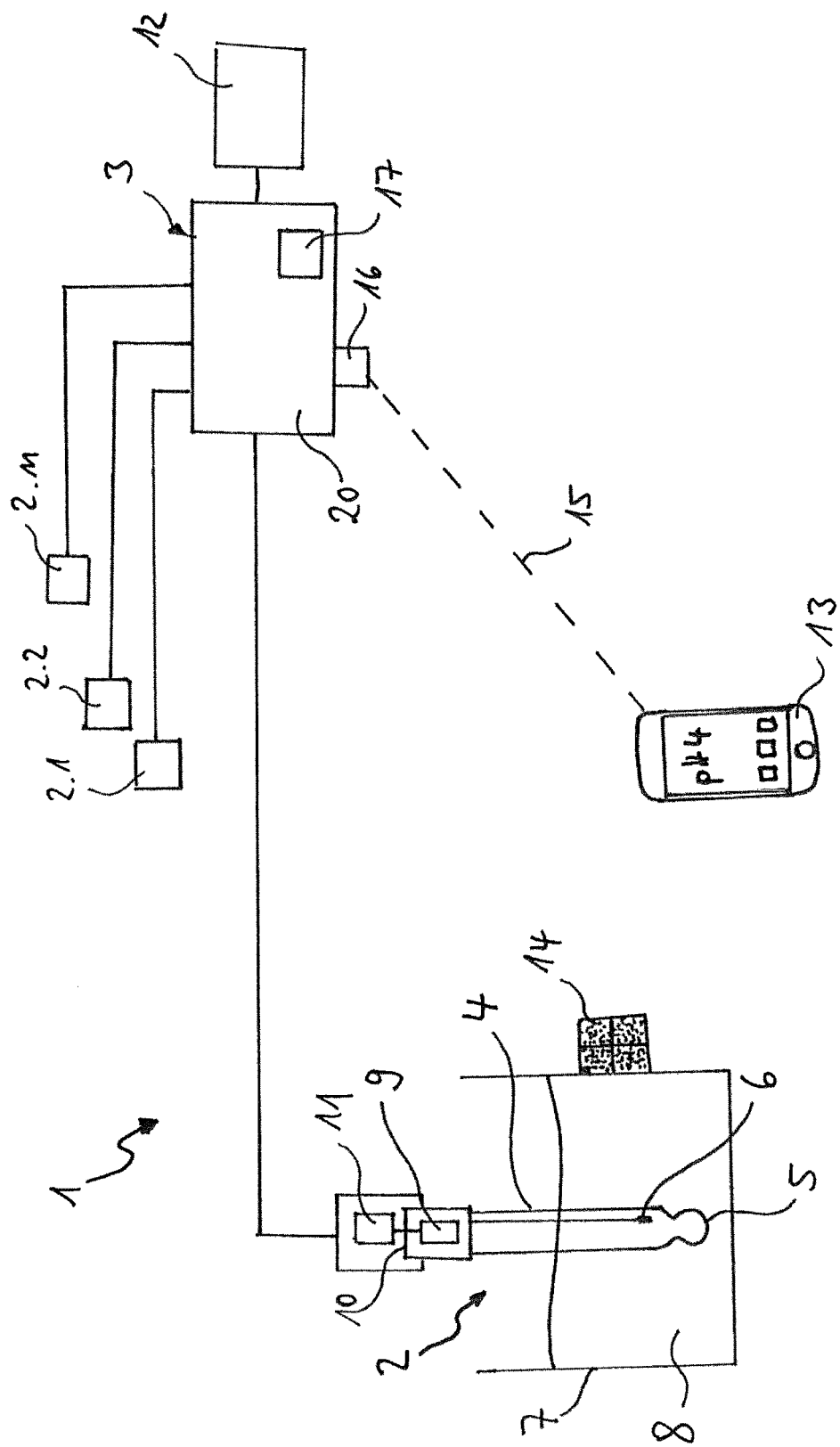

METHOD FOR SERVICING A FIELD DEVICE

TECHNICAL FIELD

The invention relates to a method for serving a field device.

BACKGROUND DISCUSSION

In industrial process measurements technology, especially for automation of chemical processes or procedures for producing a product from a raw or starting material by the use of chemical, physical or biological processes and/or for control of industrial plants, measuring devices installed near to the process, so-called measuring field devices and/or actuators installed near to the process, such as control elements or valves, are applied. These devices installed near to the process are also referred to as field devices. Field devices embodied as sensors can monitor, for example, process measurement variables, such as pressure, temperature, flow, fill level or measured variables of liquid or gas analysis, such as pH-value, conductivity, concentrations of certain ions, chemical compounds and/or concentrations or partial pressures of gases.

In a production plant, frequently a large number of the most varied of field devices are used. A field device arranged at a certain location in the process, for example, a sensor installed at a certain location and embodied for registering one or more measured variables, forms a measuring point. A measuring point can also comprise a plurality of sensors and/or actuators arranged at a shared location of installation in the immediate vicinity of one another for registering the same or different measured variables of the process at this location of installation. For example, a measuring point can comprise a temperature sensor and a pH sensor, which register the temperature and the pH-value of the medium present at the location of installation.

Sensors include, as a rule, a measuring transducer, which is embodied to register the monitored measured variable and to produce an electrical measurement signal correlated with the current value of the measured variable. For additional processing of the measurement signal, the sensor includes a sensor electronics, which is embodied further to condition the electrical measurement signal, for example, to digitize it or to convert it into a derived variable, and, in given cases, to output the result to a superordinated unit.

In the case of sensors of the aforementioned type, the particular sensor electronics is frequently electrically connected with a superordinated electronic data processing system arranged most often spatially removed and, in given cases, also spatially distributed relative to the respective measuring point. Measured values produced by the respective sensor, diagnosis relevant data and other sensor data are forwarded to the superordinated electronic data processing system. Also actuators are correspondingly connected with the electronic data processing system for the purpose of their control. The superordinated data processing system can especially have one or more electronic process controllers, for example, one or more measurement transmitters located on-site or programmable logic controllers (PLC) or one or more process control computers installed in a remote control room.

Serving, at least sectionally, for data transmission in such industrial data processing systems are fieldbus systems, such as e.g. Foundation Fieldbus, Profibus, etc. or, for example, also networks based on the Ethernet standard as well as the corresponding, most often application independently standardized, transmission protocols.

Field devices include for communication with the superordinated data processing system frequently a transceiver, which is embodied to receive signals from the superordinated data processing system, for example, a control unit such as a PLC or a process control computer, respectively to output signals from the field device to the superordinated data processing system.

Thus, the sensor electronics of many sensors includes a transceiver, which is embodied to convert the electrical, in given cases, digitized, measurement signals of the sensor into a signal transmittable according to a transmission protocol processable by the fieldbus system and by the superordinated data processing system and to output such to the superordinated data processing system. Moreover, the transceiver is embodied to receive signals, data and/or control commands from the superordinated data processing system, especially a PLC or a process control computer, and, in given cases, to condition and/or to process such. Such sensors are known, for example, from DE 10 2008 029 956 A1 (US 2010026518) or DE 10 2011 107 717 A1 (U.S. Pat. No. 8,766,168). These sensors come frequently without their own display system or input means. In this case, display of measured values, respectively input of parameter data or other data and/or commands, can occur by means of the superordinated data processing system, e.g. by means of a PLC or a process control computer. Similar options exist for actuators.

If on-site, i.e. at the location of installation of the field device, a maintenance measure is to be performed, or if a service technician requires, on-site, the current measured value or other sensor data registered by a field device embodied as a sensor, respectively the maintenance measure requires the input of parameters and/or control commands into the sensor electronics, an on-site applicable display and/or service device is required. This plays a role especially in the case of more maintenance intensive measuring points, for example, in the case of measuring points, where electrochemical or optical sensors for gas- and liquid analysis are applied. These sensors or at least parts of these sensors must regularly be calibrated, adjusted, cleaned or replaced.

Described in German Gebrauchsmuster DE 20 2012 102138 U1 is an arrangement for the read-out of identification information of a field device by means of a separate, portable, read-out unit, wherein associated with the field device is a readable identification, which includes at least one 2-D code, especially a QR code or a data matrix code. The identification information can be applied on a tag, which is connected, e.g. adhered or attached to the field device. If the location of installation of the field device is difficultly accessible for a service technician, the tag can also be placed at a site remote from the field device and more easily accessible. The read-out identification information is used in the case of the arrangement described in DE 20 2012 102 138 U1, in order to retrieve from a database other information concerning the field device, also when the field device itself does not have a display system and a display system of a superordinated data processing system is not available on-site.

Known from German Patent DE 10 2009 028 794 A1 is a measuring apparatus for determining a physical or chemical, measured variable, which includes a sensor unit and a mobile service unit, e.g. a mobile telephone. The service unit is embodied to communicate with the sensor unit, wherein associated with the sensor unit is a transceiver unit, which has a first communication means, in order to receive data from the sensor unit and to transmit data to the sensor unit. The transceiver unit also has a second communication means, which includes an interface to a telecommunications network, in order to transmit data to the service unit and to receive data from the service unit, which likewise has an interface to the telecommunication-network. Disadvantageous in this measuring apparatus is that the service device for servicing a sensor unit must use the particular address of the sensor unit in the telecommunication-network. If the service device is used for servicing a large number of different sensors of a complex process installation, always the right address of the respective measuring device must be identified and the corresponding connection established. A further disadvantage is that the transceiver unit associated with the sensor unit must have a second communication means with interface to the telecommunication-network, in order to enable communication with the service device. This causes additional manufacturing costs for the measuring apparatus.

SUMMARY OF THE INVENTION

An object of the present invention is to provide a method for servicing a field device, overcoming the above described disadvantages and enabling servicing of the field device on-site, even when there is on-site no permanently installed display and input apparatus associated with the field device.

The object is achieved by a method for servicing a field device including the method of servicing a field device, wherein the at least one field device is connected with a superordinated data processing system, comprising steps of: transmitting data associated with the field device, especially measured values or diagnosis relevant parameters, from the superordinated data processing system to the service device via a radio connection between a mobile, especially portable, service device and the superordinated data processing system based on identification information uniquely identifying a field device transceiver associated with the field device; and/or transmitting servicing data, especially parameter data and/or control commands, from the service device to the superordinated data processing system; and servicing the field device through the superordinated data processing system based on the servicing data transmitted from the service device, and the apparatus including an apparatus for performing the method comprising the steps of: a sensor for liquid and/or gas analysis, especially one of: a pH-sensor, a conductivity sensor, an oxygen sensor, a chloride sensor, a nitrate sensor, a turbidity sensor, a sensor for measuring a solids fraction, an ion-selective electrode (ISE) or a carbon dioxide sensor; the apparatus comprising: at least one field device; a field device transceiver associated with the field device; a superordinated data processing system connected, especially via a fieldbus system, with the field device transceiver; and a mobile, especially portable, service device, wherein: said superordinated data processing system and said service device are embodied to communicate with one another via a radio connection; said service device is embodied to transmit identification information uniquely identifying the field device transceiver as well as servicing data via the radio connection to the data processing system; and said superordinated data processing system is embodied based on the identification information and the servicing data to service the field device.

The method for servicing a field device, wherein the at least one field device is connected with a superordinated data processing system, includes steps as follows:

transmitting data associated with the field device, especially measured values or diagnosis relevant parameters, from the superordinated data processing system to the service device via a radio connection between a mobile, especially portable, service device and the superordinated data processing system based on identification information uniquely identifying a field device transceiver associated with the field device; and/or transmitting servicing data, especially parameter data and/or control commands, from the service device to the superordinated data processing system; and servicing the field device through the superordinated data processing system based on the servicing data transmitted from the service device.

In an advantageous embodiment, the method includes a step of reading-in the identification information uniquely identifying the field device transceiver by means of the service device.

Since the mobile service device communicates with the superordinated data processing system via a radio connection, it can forward servicing data, such as control commands or parameter settings, via the data processing system to the field device. Conversely, data, which the field device communicates to the data processing system, can be transmitted from the data processing system to the service device. Via the data processing system, the service device can service a plurality of different field devices connected with the data processing system in a process installation, without having to establish a connection separately with each individual service device. The service device need, consequently, in order to communicate with one or more field devices connected with the superordinated data processing system, use only the address of the superordinated data processing system and establish a radio connection therewith. A managing of individual addresses of all field devices to be serviced is, in contrast, not required. Also, each field device to be serviced does not need to use additional communication means for communication with the service device. Rather, communication with the service device occurs via the superordinated data processing system, with which the field device is in any event connected, via the field device transceiver associated with, for example, wired with, the field device.

The field device transceiver serves, such as already described, for communication between the field device and the superordinated data processing system, i.e. it is embodied to receive signals from the superordinated data processing system, respectively to output signals from the field device to the superordinated data processing system. The superordinated data processing system can be embodied, for example, as a measurement transmitter, as a PLC or as a process control computer. In this case, the field device transceiver receives signals of the PLC or of the process control computer and/or outputs signals from the field device to the measurement transmitter, the PLC or the process control computers. The superordinated data processing system can also be formed of a plurality of spatially distributed, computational units, e.g. programmable logic controllers or a plurality of separate computers, connected with one another for communication. In this case, the field device transceiver is embodied for communication with one or more of the computational units. The superordinated data processing system can be connected with the field device via one of the initially mentioned fieldbus systems. The superordinated data processing system can also be formed by a process monitor, which is embodied via a fieldbus, which connects the field device and, in given cases, other field devices with a process controller, to register, in given cases, further to process and to indicate, transmitted signals.

To the extent that the field device is embodied as a sensor, it can have a field device transceiver, which is embodied to convert the electrical, in given cases, digitized, measurement signals of the sensor into a signal according to a transmission protocol transmittable via the fieldbus system and processable by the superordinated data processing system and to output such to the superordinated data processing system. Moreover, the field device transceiver can be embodied to receive and, in given cases, to condition and/or to process signals, data and/or control commands from the superordinated data processing system.

In an embodiment, the field device can comprise a sensor for liquid and/or gas analysis, especially a pH-sensor, a conductivity sensor, an oxygen sensor, a chloride sensor, a nitrate sensor, a turbidity sensor, a sensor for measuring a solids fraction, an ion-selective electrode (ISE) or a carbon dioxide sensor.

The superordinated data processing system can comprise a display- and/or control unit, for example, a PLC or a process control computer, connected with the field device transceiver for communication. The control unit registers signals output by the field device transceiver, for example, measurement signals, and processes these further and, in given cases, displays them. The control unit can, moreover, control the field device and/or control a process by means of the signals obtained from the field device, and for this purpose output data and/or control commands to the field device. The control unit can in this embodiment communicate via radio with the service device by means of a radio transceiver associated with the control unit, especially a radio transceiver permanently connected with the control unit. The communication with the mobile service device via this radio connection can occur especially according to the wireless HART-, WLAN-, ZigBee-, RFID-, Bluetooth-, GSM- or UMTS standard. For this purpose, the service device includes a corresponding radio transceiver.

The identification information can be read-in from an information carrier, especially a tag bearing an optically readable code or an RFID transponder. The optically readable code can be, for example, a barcode, a 2D code, especially a QR code or a data matrix code.

The service device can be a handheld, a smart phone, a portable computer, especially a laptop or a tablet PC. The service device can comprise an optical scanner or a camera for reading-in the identification information, when the information carrier has an optically readable code. The service device can for reading-in the coded information execute software, which decodes the identification information from the image information read-in by the scanner or camera and stores such in a memory of the service device in a format processable by the service device.

If the information carrier is a tag carrying an RFID transponder, the service device for reading-in the identification information can have a corresponding RFID reading device, which reads the identification information from the RFID transponder and stores such in a memory of the service device.

The information carrier can be arranged at a site remote from the field device, especially externally on an assembly containing the field device, externally on a process container or on the door of an electrical cabinet. Since the information carrier is not fixedly connected with the field device, an option is to apply it onto a site easily accessible for a service technician, in order to facilitate servicing of the field device. This is especially advantageous, when the field device is arranged completely within an assembly, through which an RFID transponder or an optical code could not be read-out.

In an embodiment, the identification information includes an identification, which is uniquely linked in a database, which the superordinated data processing system can access, with a serial number of the field device and/or a measuring point formed by the field device to be serviced at its location of installation, wherein the service device transmits the identification to the superordinated data processing system and the data processing system accesses the database and based on the identification ascertains the field device to be serviced.

In an embodiment, the field device transceiver can be a component of the field device and/or be permanently connected with such. If the field device is, for example, a sensor for registering a physical or chemical, measured variable, the transceiver unit can be a component of a sensor electronics accommodated in a housing of the sensor. In this case, the identification information identifying the field device transceiver is simultaneously associated with the field device itself. The identification information can, in this case, be, for example, an identification, a tag, which is uniquely linked with a serial number of the field device in a database accessible by the superordinated data processing system. The service device can transmit the read-in identification via the radio connection to the superordinated data processing system, whereupon the data processing system accesses the database and based on the identification uniquely ascertains the field device to be serviced. Furnished in the database can be information concerning the field device in question, e.g. calibration information, diagnosis parameters or information concerning the measuring point defined by the field device and its location of installation. The information furnished in the database can be transmitted from the data processing system upon query or automatically via the radio connection to the service device. Conversely, the service device can transmit to the superordinated data processing system servicing data, which can, for example, be generated by input of a user or automatically in the service device. The servicing data can be, for example, parameters to be transmitted to the field device or control commands for data representing the field device.

In another embodiment, the field device transceiver can be connected releasably with the field device. This is especially advantageous, when the field device is a sensor for liquid and/or gas analysis, such as e.g. a pH-sensor, a conductivity sensor, an oxygen sensor, a chloride sensor, a nitrate sensor, a turbidity sensor, a sensor for measuring a solids fraction, an ion-selective electrode (ISE) or a carbon dioxide sensor, since these sensors must from time to time be replaced and/or removed from their location of installation for maintenance measures. In this embodiment, the identification information identifying the field device transceiver designates thus not the individual field device, but, instead, the measuring point, which in the course of time can be formed by a large number of different field devices arranged one after the other at one and the same location of installation, different field devices, which are, in each case, replaced upon reaching the end of their duration of operation. The identification information can have an identification, which is linked with properties of the measuring point in a database, which also the data processing system can access. Upon start-up of the field device at the measuring point, identification of the field device and, in given cases, other data of the field device are written into the database. Based on the identification information transmitted from the service unit, the data processing system ascertains the identification of the field device stored in the database and, in given cases, other data stored in the database, e.g. calibration parameters or diagnosis relevant information. These data can be transmitted by the data processing system to the service device automatically or upon query or used for servicing the field device. Based on the identification information identifying the field device transceiver, the superordinated data processing system can in this embodiment contact the field device transceiver and transmit to the service unit the data, e.g. measured values, provided to the field device transceiver by the field device releasably connected therewith. Conversely, the superordinated data processing system can correspondingly, based on input of a user via the service device, transmit data and/or commands to the field device connected releasably with the field device transceiver.

The apparatus of the invention for performing the method comprises: at least one field device, a field device transceiver associated with the field device, a superordinated data processing system connected with the field device transceiver, especially via a fieldbus system, and a mobile, especially portable, service device, wherein the superordinated data processing system and the service device are embodied to communicate with one another via a radio connection, wherein the service device is embodied to transmit identification information uniquely identifying the field device transceiver as well as servicing data via the radio connection to the data processing system, and wherein the superordinated data processing system is embodied based on the identification information and the servicing data to service the field device.

The apparatus can further comprise an information carrier, which has the identification information uniquely associated with the field device transceiver, wherein the service device is embodied to read-in the identification information from the information carrier.

The apparatus can supplementally have one or more features of the embodiments already described above in connection with the method.

In an advantageous embodiment, the information carrier is not secured to the field device. Therewith, the information carrier can also be arranged at a site remote from the field device, especially externally on an assembly containing the field device, externally on a process container or on a door of an electrical cabinet. Since the information carrier is not fixedly connected with the field device, an option is to apply it at a site easily accessible for a service technician, which, on the whole, facilitates the servicing of the field device. This is especially advantageous when the field device is arranged completely in an assembly, through which an RFID transponder or an optical code could not be read-out.

BRIEF DESCRIPTION OF THE DRAWINGS

The invention will now be explained in greater detail based on the example of an embodiment illustrated in the drawing, the sole FIGURE of which shows as follows:

FIG. 1 is an apparatus for servicing a field device by means of a mobile service device.

DETAILED DISCUSSION IN CONJUNCTION WITH THE DRAWINGS

FIG. 1 shows schematically a process installation 1 with a field device 2, which is connected with a superordinated data processing system 3. Data processing system 3 is embodied in the present example as a PLC 20, which is connected with a service unit 12. Service unit 12 includes a display and input unit, for example, an HMI. Process installation 1 includes a plurality of other field devices 2.1, 2.2, 2.$n$ connected with the data processing system 3. Field device 2 is arranged in a process container 7 (only schematically arranged) containing a process medium 8. Field device 2 is embodied in the example of an embodiment shown here as a pH-sensor 4 with a conventional pH-glass electrode 5 and an integrated temperature sensor 6 and, by means of an assembly, for instance a retractable assembly (not illustrated in detail), so connected with the process container 7 that the glass electrode 5 extends into the measured medium 8, in order to register its pH-value. The temperature sensor is mounted in the housing of the pH-sensor near to the process medium 8 such that it registers essentially the temperature of the medium 8. Process container 7, which is only schematically indicated, can be, for example, a pipeline carrying the process medium 8 or it can be a reactor, especially a fermenter. The field device 2 so arranged at a predetermined location of installation forms a measuring point of the process installation.

The analog primary signals provided by the glass electrode 5, respectively the temperature sensor 6, are registered and, in given cases, amplified and/or converted into a digital signal by a sensor electronic 9 arranged in an electronics-housing of the pH-sensor 4. The signal so processed by the sensor electronics 9 is output via an interface 10 to a field device transceiver 11 connected with the sensor electronics 9. The field device transceiver 11 is embodied to convert the measurement signals of the pH-sensor 4 into a signal according to a transmission protocol transmittable via the fieldbus system 21 and processable by the superordinated data processing system 3 and to output such to the data processing system 3. Moreover, the field device transceiver 11 is embodied to receive and, in given cases, to condition and/or process signals transmitted to it via the fieldbus system 21 by the superordinated data processing system 3. In the example of an embodiment shown here, communication between the field device transceiver 11 and the data processing system 3, respectively the PLC 20 occurs by wire. In an alternative embodiment, however, also a wireless communication can be provided.

The interface 10 between the sensor electronics 9 and the field device transceiver 11 can be a galvanic interface. It is, however, also possible to provide an inductive, capacitive or optical interface, in order to achieve galvanic isolation of the pH-sensor 4 from the field device transceiver 11. In the example of an embodiment shown here, the sensor electronics 9 is located in a primary element of a plugged connection. The primary element is fixedly connected with the glass electrode 5 and serves as electronics housing of the pH-sensor 4. The field device transceiver 11 is arranged in a secondary element of the plugged connection releasably connectable with the electronics housing of the pH-sensor 4.

In an alternative embodiment, the field device transceiver can be arranged together with the sensor electronics in a shared housing, which is a component of the field device inseparable from the measuring transducer of the field device, here the glass electrode 5. Because in the present example the field device is a pH-sensor, the arrangement of the field device transceiver 11 in a secondary element of a plugged connection releasably connectable with the glass electrode is advantageous, since pH-sensors are regularly replaced. In the embodiment shown here, the same field device transceiver 11 can be used with a plurality of pH-sensors, which are applied one after the other at the measuring point.

The measuring point with the field device 2 is arranged spatially widely removed from the superordinated data processing system. Applied for servicing the pH-sensor 4 on-site, i.e. at the measuring point, especially for reviewing the current measured value of the pH-sensor 4, for request of other data, especially diagnosis relevant data, of the pH-sensor 4 or for maintenance, especially calibrating, of the pH-sensor 4, is a mobile, especially portable, service device 13. Servicing device 13 can be, for example, a handheld, a mobile telephone, especially a smart phone, a portable computer, especially a laptop or a tablet PC.

Arranged on the process container 7 is an information carrier 14, which bears, coded in the form of a 2D data matrix code, identification information, which uniquely identifies the field device transceiver 11. The information carrier 14 can be arranged at any location, which is, however, preferably easily accessible for read-in of the coded identification information. Servicing device 13 includes a read-in system, which is embodied for read-in of the identification information arranged on the information carrier 14. In the present example, the reading unit is a smart phone, which includes a camera. The smart phone includes, executable by a processor of the smart phone, a computer program, which serves to win the identification information from the photographed image by means of a pattern recognition method and to store such in a memory of the smartphone in a format processable by additional computer programs installed on the smart phone. The identification information can also be displayed on the smartphone in an understandable text format for a service technician.

Alternatively, the mobile service device can also have a reading unit connected releasably with the service device. For example, a tablet PC or laptop applied as service device can be connected with an optical scanner via a standard-interface, e.g. a USB-interface. If the information carrier is not in the form of an optically readable code, but, instead, an RFID transponder, the service device can be connected with an RFID reading device via the standard-interface. The identification information registered by the reading unit is then forwarded to the service device and stored by the service device in a memory in a format processable and/or displayable by the service device.

The so read-in identification information is forwarded by the service device 13 automatically via a radio connection 15 to the superordinated data processing system 3 (in the example shown here, to the programmable logic controller 20). PLC 20 includes, for this, a radio transceiver 16, which can establish a radio connection for communication with the mobile service device 13.

The identification data transmitted to the PLC include a unique identification of the field device transceiver 11 linked with the measuring point. PLC 20 can access a database, in which associated with this identification is additional information concerning the measuring point, especially information concerning the pH-sensor 4 currently connected with the field device transceiver 11. The database in the here described example is held in a memory 17 of the PLC 20. Alternatively, the database can also be held in a data memory away from the PLC 20, especially in a server, which the PLC can access.

Furnished in the database can be, for example: The name of the sensor currently connected with the field device transceiver 10, especially the serial number of the sensor or a TAG uniquely associated with the sensor, the ordering information of the sensor, its device specification, manufacturer information, device driver information, current calibration data of the pH-sensor, a calibration data history of the sensor, the total duration of operation, a loading history, the time until next calibration due, the remaining service life of the sensor, a history of the temperature- and/or pH-value loadings, which the sensor was exposed to during its previous operation, a history of the response time of the sensor.

Upon query by the service device or automatically, the PLC transmits all or a part of the data in the database to the service device 13. For request of some or all of the stored data, a service person can, for example, by means of a service, or operating, program executable by the service device 13, select the data to be transmitted. Based on the input of the service technician, the service device 13 produces the servicing data representing the desired request and such data are transmitted to the PLC via the radio path 15. The PLC transmits, based on the servicing data, the selected data to the service device 13, which displays the received data on its display.

For display of the current measured value of the pH-sensor 4 via the display of the service device 13, the service device transmits, besides the identification information, servicing data, which correspond to a request to the PLC that it transmit the current measured value via the radio path 15. This request can be transmitted to the PLC either automatically or upon an explicit input to the service device. The PLC ascertains, based on the transmitted identification data and the database stored in the memory 17, the field device 2, whose measured value should be transmitted to the service device, and transmits its measured value, which the PLC 20 obtains via the field device transceiver 11, then via the radio path 15 to the service device 13. In the present example, in this way, the current pH-value registered by the pH-sensor 4 and/or the temperature value currently registered by the temperature sensor 6 can be transmitted to the service device 13 and displayed by such.

For controlling the field device 2 or for transmitting data from the service device 13 to the field device 2, the identification information together with control commands serving as servicing data or the identification information together with the data to be transmitted are transmitted to the PLC 20 via the radio path 15. The servicing data are generated also in these cases of application by the operating program executable by the service device 13 based on input of a service technician and sent to the PLC 20. The PLC 20 ascertains based on the identification information, such as described, the field device 2 to be serviced and outputs either corresponding control commands to the field device transceiver 11 or transmits the data to be transmitted to the field device transceiver 11. This in turn sends the commands or the data to the sensor electronics 9, which executes the control commands and/or stores the data in a memory of the sensor electronics 9.

In analogous manner, a calibration of the pH-sensor 4 can be performed by means of the servicing software executable in the service device 13, wherein the calibration measured values ascertained in calibration measurements in buffer solutions are transmitted via the PLC 20 to the service device 13, which ascertains corresponding new calibration parameters, for example, zero-point and slope of a sensor characteristic curve, by means of the servicing software of the service device 13, and transmits such back to the PLC 20, where such are stored in the database stored in the memory 17. Additionally or alternatively, the PLC 20 can forward the newly ascertained calibration parameters also via the field device transceiver 11 to the sensor electronics 9, where they are stored in a memory.

The invention claimed is:

1. A method for servicing a field device connected with a superordinated data processing system, comprising:
   establishing a radio connection for communication between the superordinated data processing system and a mobile service device;
   transmitting field device identification information from the mobile service device to the superordinated data processing system via the radio connection, wherein the identification information uniquely identifies a field device transceiver associated with the field device;
   transmitting a request from the mobile service device to the superordinated data processing system via the radio connection for measured values and diagnostic data from the field device;
   obtaining the measured values and diagnostic data from the field device by the superordinated data process system;
   transmitting the measured values and diagnostic data associated with the field device from the superordinated data processing system to the mobile service device via the radio connection;
   transmitting servicing data, including parameter data and control commands, from the mobile service device to the superordinated data processing system via the radio connection; and
   servicing the field device through the superordinated data processing system based on the transmitted servicing data, including the parameter data and control commands, wherein the servicing includes sending the parameter data and control commands from the superordinated data processing system to the field device.

2. The method as claimed in claim 1, further comprising:
   reading-in the identification information by means of the mobile service device.

3. The method as claimed in claim 2, wherein:
   the identification information is read-in from an information carrier, the information carrier including an optically readable code or an RFID transponder.

4. The method as claimed in claim 3, wherein:
   the information carrier is arranged at a site remote from the field device.

5. The method as claimed in claim 3, wherein the information carrier includes an optically readable code and the mobile service device includes a scanner or a camera, the method further comprising:
   registering the optically readable code as image information by means of the scanner or the camera;
   extracting from the registered image information using a pattern recognition method the identification information in a format processable by the mobile service device and the superordinated data processing system; and
   storing the identification information in a memory of the mobile service device.

6. The method as claimed in claim 1, wherein:
   the field device includes a sensor for liquid or gas analysis.

7. The method of claim 6, wherein the sensor is one of the following: a pH-sensor; a conductivity sensor; an oxygen sensor; a chloride sensor; a nitrate sensor; a turbidity sensor; a sensor for measuring a solids fraction; an ion-selective electrode; and a carbon dioxide sensor.

8. The method as claimed in claim 1, wherein:
   the superordinated data processing system includes a display and control unit connected with the field device transceiver for communication; and
   the display and control unit is embodied for servicing the field device and has a radio transceiver via which the display and control unit communicates with the mobile service device.

9. The method of claim 8, wherein the display and control unit communicates with the mobile service device according to a wireless HART-, WLAN-, ZigBee-, RFID, Bluetooth-, GSM- or UMTS standard.

10. The method as claimed in claim 1, wherein:
    the identification information includes an identification, which is uniquely linked in a database, which the superordinated data processing system can access, with a serial number of the field device or a measuring point formed by the field device to be serviced at its location of installation; and
    the mobile service device transmits the identification to the superordinated data processing system and the superordinated data processing system accesses the database and based on the identification ascertains the field device to be serviced.

11. The method of claim 10, further comprising:
    reading from the database via the superordinated data processing system one or more of the following sensor data: a name; a serial number; ordering information; device specification; manufacturer information; device driver information; calibration data; loading history; a time until a next calibration is due; a remaining life; a history of temperature loadings; a history of pH loadings; and a history of response time; and
    transmitting from the superordinated data processing system to the mobile service device the read sensor data.

* * * * *